US012547648B2

(12) United States Patent
Jensen et al.

(10) Patent No.: US 12,547,648 B2
(45) Date of Patent: Feb. 10, 2026

(54) LANGUAGE MODEL DECODING FOR SEARCH QUERY COMPLETION

(71) Applicant: Maplebear Inc., San Francisco, CA (US)

(72) Inventors: Jacob Jensen, Metuchen, NJ (US); Fei Jia, Kirkland, WA (US); Esther Vasiete Allas, New York, NY (US); Manmeet Singh, Santa Clara, CA (US); Lee Cohn, Chicago, IL (US); Tejaswi Tenneti, San Carlos, CA (US)

(73) Assignee: Maplebear Inc., San Francisco, CA (US)

( * ) Notice: Subject to any disclaimer, the term of this patent is extended or adjusted under 35 U.S.C. 154(b) by 273 days.

(21) Appl. No.: 18/510,565

(22) Filed: Nov. 15, 2023

(65) Prior Publication Data

US 2025/0156451 A1    May 15, 2025

(51) Int. Cl.
*G06F 16/332* (2025.01)
*G06F 40/284* (2020.01)
*G06F 40/40* (2020.01)

(52) U.S. Cl.
CPC ........ *G06F 16/3322* (2019.01); *G06F 40/284* (2020.01); *G06F 40/40* (2020.01)

(58) Field of Classification Search
CPC ..... G06F 16/3322; G06F 40/284; G06F 40/40
USPC ............................................................. 704/9
See application file for complete search history.

(56) References Cited

U.S. PATENT DOCUMENTS

2021/0192134 A1*  6/2021  Yue ..................... G06F 3/04895

* cited by examiner

*Primary Examiner* — Thierry L Pham
(74) *Attorney, Agent, or Firm* — Fenwick & West LLP (57) ABSTRACT

A language model is used to generate autosuggestions to complete or revise a user's partial search query. An initial partial query is applied to the language model to generate query candidates for completing the search query. The language model may generate the query candidates as additional or alternate tokens for the partial search query. When the user revises the partial query, the previously-generated candidates can be re-used to reduce subsequent processing time for generating additional candidates. The previously-generated candidates are compared with the revised partial query to select which of the candidates to be re-used and expanded for generating additional tokens. Additional tokens can be generated in parallel for the previously-generated candidates or with model values from the previous generation, enabling the tokens to be generated effectively with reduced latency consistent with user expectations for search-related autosuggestions.

20 Claims, 4 Drawing Sheets

LANGUAGE MODEL DECODING FOR SEARCH QUERY COMPLETION

BACKGROUND

Users for various types of search systems may enter a search query to be executed against a database. Typically, users access an interface for entering the search query and enter the search query in the interface with sequential keypresses, such that individual characters are entered that may ultimately form terms or other tokens for the search query. To aid users in more quickly entering the complete search query for execution of search, the currently-entered input by the user may be used to suggest tokens for at least a portion of the complete query.

Effectively suggesting these terms is challenging for several reasons. Users may misspell intended words or revise previously-entered words, such that the currently-entered characters may not necessarily represent a "prefix" for the completed search query. In addition, suggestions based exclusively on previous queries may be too limited by the specific data of previous search queries, limiting flexibility given the large number of possible terms used by users. As one potential solution, large language models, such as "Transformer" models, are typically trained on a large enough corpus of data to effectively account for many different terms. However, as search query suggestions are typically generated as users are entering the query, the complexity of such large language models can introduce unacceptable latency and other delay, making it difficult to effectively apply such models to this problem.

SUMMARY

In accordance with one or more aspects of the disclosure, suggestions for a partial search query are generated by a language model that generates autosuggest candidates that may be sequentially expanded by the language query. Rather than re-generate all autosuggest candidates when the user revises the partial query, previous autosuggest candidates are evaluated with respect to the revised partial query to determine which of the previous candidates to maintain. The maintained candidates may then be expanded by the language model, which can be applied to generate additional tokens for the maintained candidates. By re-using the previous candidates relevant to the revised partial query, model values (e.g., encoding of a prompt input sequence or a sequence of output tokens) used to generate the previous candidates may be reused to generate additional tokens that "expand" the previous candidates while also keeping runtime latency low. In addition, expansion of each maintained candidate may be performed in parallel (and in parallel with generation of candidates based directly on the revised partial query), enabling generation of a large number of candidates without excess runtime.

In addition, scoring the previous autosuggest candidates relative to the revised partial query enables the autosuggest candidates to maintain candidates that provide spelling correction or other revision that may more accurately reflect user intent when the revised partial query includes unintended errors. Before sending query candidates to the user, the query candidates may also be evaluated with respect to a search space, confirming that the query candidates (which may be generated with a broad language understanding) are consistent with the narrower search space. Finally, the language model over time may be fine-tuned based on the search queries actually entered by users.

DETAILED DESCRIPTION

Figure 1:
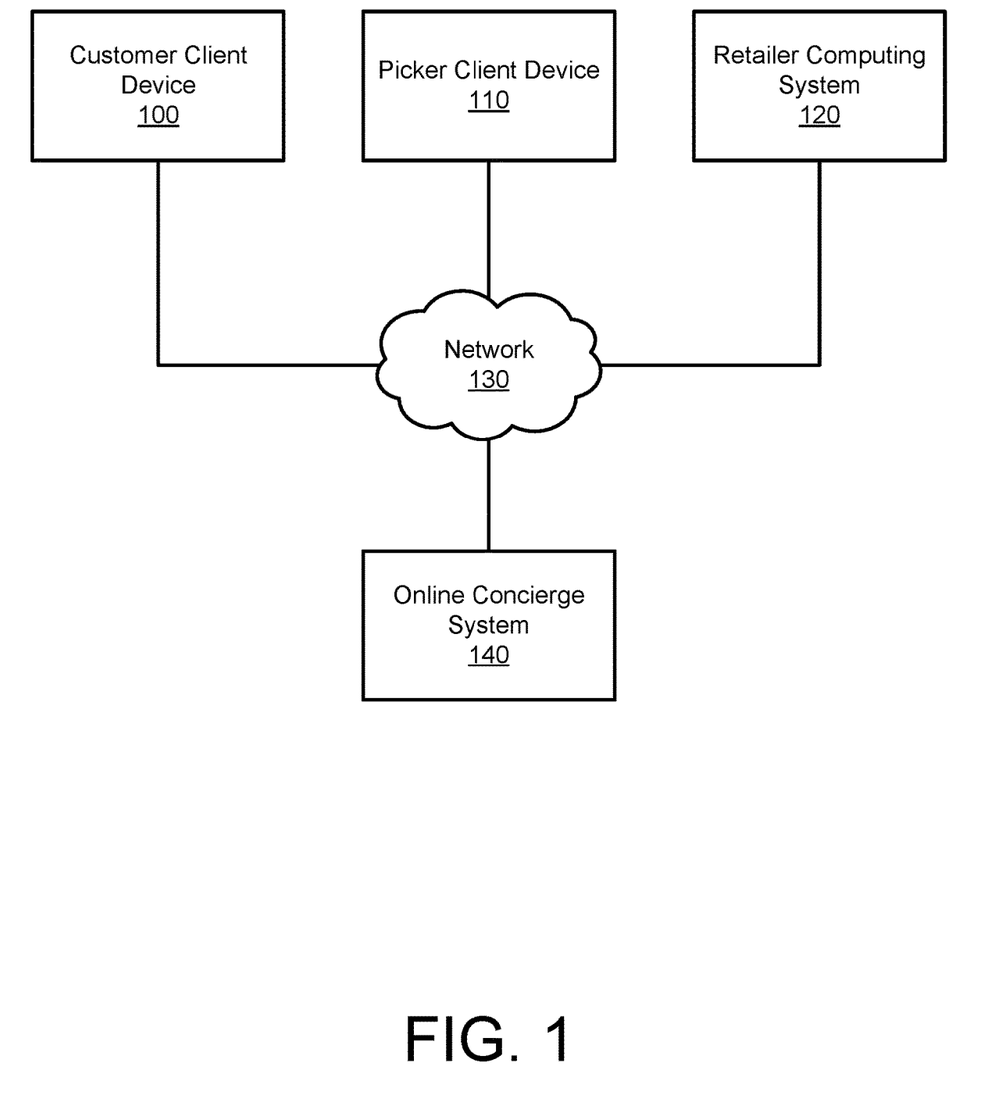
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The system environment of FIG. 1 is one example in which search queries may be entered by users for identifying relevant results in a search space. As discussed further below, a user may enter a search query and, during entry of the search query, receive suggestions for completing or correcting a partial query before completing the search for execution against the search space. Similar approaches and components for searching and, more particularly, aiding in search query completion with suggestions, may be applied to different system environments and contexts.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit (SKU) or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
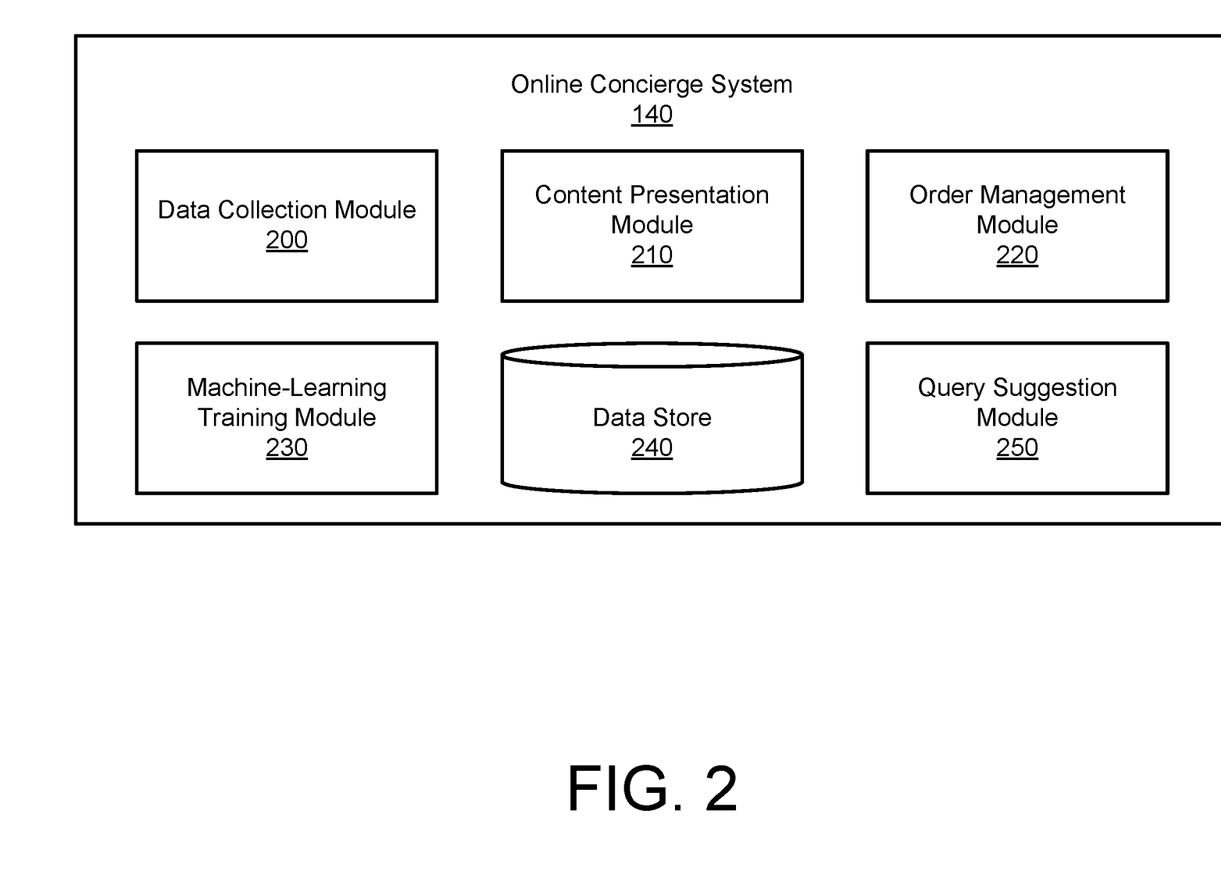
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, and a query suggestion module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The search query may be determined by the user in conjunction with the query suggestion module 250 that provides suggestions for revising partial search queries entered on the user's device and before submitting the search query for evaluation. As one way to execute the search query, the content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of the order. In some embodiments, the order management module 220 computes an estimated time of arrival of the picker to the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, hierarchical clustering, and neural networks. Additional examples also include perceptrons, multilayer perceptrons (MLP), convolutional neural networks, recurrent neural networks, sequence-to-sequence models, generative adversarial networks, and transformers. A machine-learning model may include components relating to these different general categories of model, which may be sequenced, layered, or otherwise combined in various configurations.

Each machine-learning model includes a set of parameters. The set of parameters for a machine-learning model are used to process an input and generate an output. For example, a set of parameters for a linear regression model may include weights that are applied to each input variable in the linear combination that comprises the linear regression model. Similarly, the set of parameters for a neural network may include the respective weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes a set of input data for which machine-learning model generates an output. For example, each training example may include customer data, picker data, item data, or order data. In some cases, the training examples also include a label which represents an expected output (i.e., a desired or intended output) of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model, whereby the machine-learning training module 230 updates parameters of the machine-learning model based on each of the set of training examples. The training examples may be processed together, individually, or in batches. To train a machine-learning model based on a training example, the machine-learning training module 230 applies the machine-learning model to the input data in the training example to generate an output with a current set of parameters. The machine-learning training module 230 scores the output from the machine-learning model using a loss function. A loss function is a function that generates a score for the output of the machine-learning model, such that the score is higher when the machine-learning model performs poorly and lower when the machine learning model performs well. In cases where the training example includes a label, the loss function is also based on the label for the training example. Example loss functions include the mean square error function, the mean absolute error, hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory computer-readable media. The data store 240 uses computer-readable media to store data and may use databases to organize the stored data.

The query suggestion module 250 coordinates entry of the search query by the user on the user device. As the user enters the search query on the device, the user may enter the search query as a sequence of characters or other entries on the user device. To help the user more quickly enter the desired search query, partial search queries are evaluated by the query suggestion module 250 to provide suggestions for additional or alternative terms of the currently-entered query. For example, a user may initially misspell an intended word that the query suggestion module 250 provides a correction for, or the user may type the complete search query more slowly than the query suggestion module 250 can suggest the complete search query based on the partial query.

Figure 3:
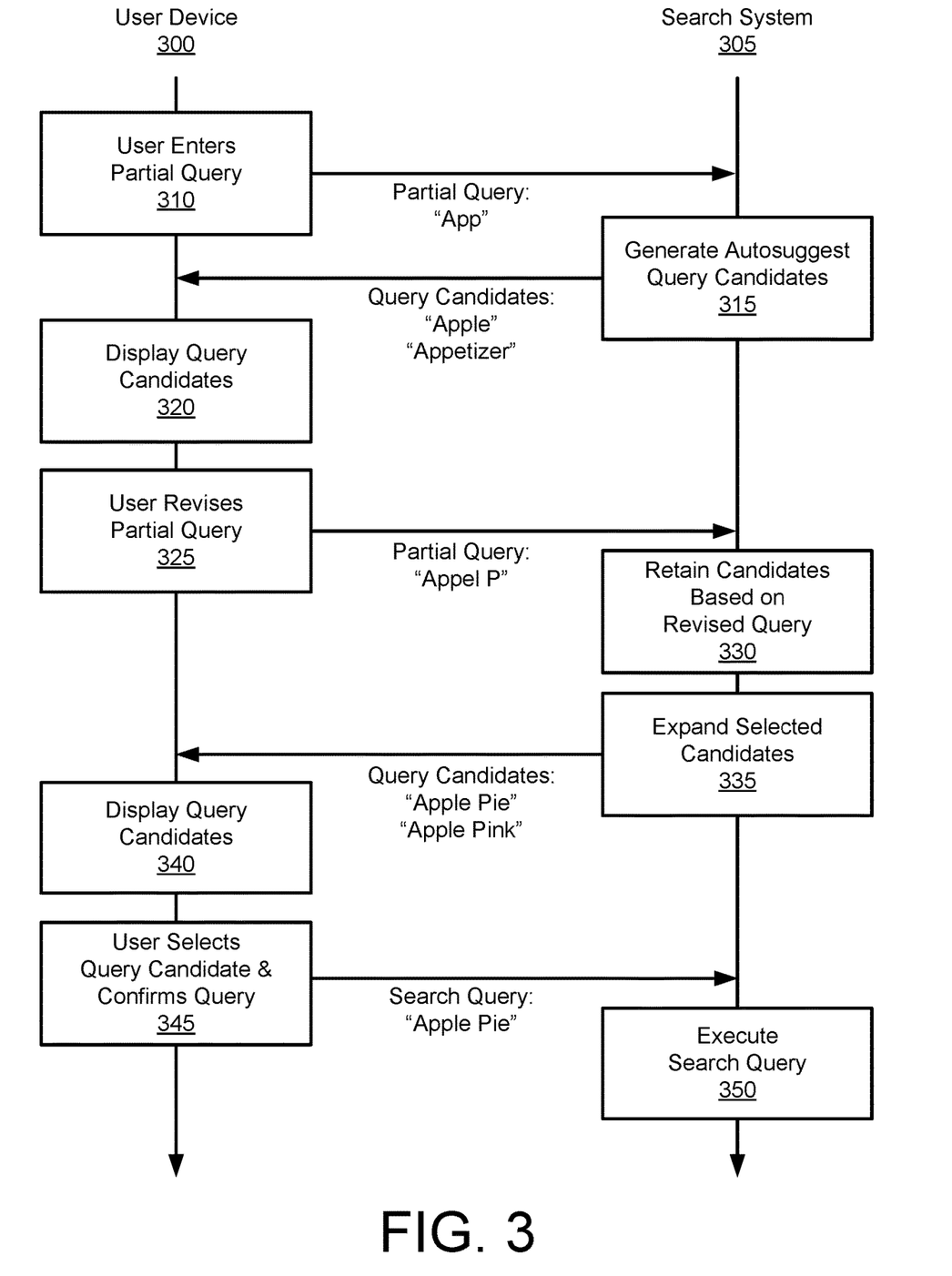
FIG. 3 shows an example timing diagram for suggesting search candidates for a search query, in accordance with one or more embodiments.

FIG. 3 shows an example timing diagram for suggesting search candidates for a search query, in accordance with one or more embodiments. Initially, a user accesses a search system 305 for performing a search with a user device 300, such as a customer communicating with the customer client device 100 to the online concierge system 140. The user device displays a search interface on which the user may enter the search query. In general, the user enters the search query sequentially as a sequence of characters on an input device, such as a keyboard (e.g., a distinct physical keyboard or as interface elements on a touchscreen). As such, the user's complete search query may be entered over time as the characters are entered; depending on the search query and the user's typing speed and accuracy, entering the search query may take several seconds to complete. The search system 305 receives partial search queries and provides "autosuggest candidates" for improving the user's entry of the desired search query. The autosuggest candidates may provide spelling corrections, word completion, and/or expansion of the partial query. In the example online concierge system of FIG. 2, processing shown by the search system 305 may be performed by the query suggestion module 250 in conjunction with the content presentation module 210.

As the user begins typing the search query, the user device 300 identifies a partial query entered 310 by the user. The partial query may be determined as a number of characters entered by the user or based on an amount of time (e.g., 100 ms) or another method. The partial query entered by the user in the search interface is sent to the search system 305 for generating autosuggest candidates. The search system 305 receives the partial query, in this example, "app" and generates 315 a set of autosuggest query candidates (which may also be referred to as "query candidates" or "autosuggest candidates") based on the partial query. The query candidates are generated with a language model applied to the partial query to generate tokens for the search query that may represent effective correction and/or expansion of the search query. Additional details of the language model and its generation of query candidates are discussed with respect to FIG. 4.

The example autosuggest query candidates shown in FIG. 3 are thus an expansion of the partial query that result in query candidates "Apple" and "Appetizer." In some embodiments, as discussed further below, the search system may also score, filter, and/or rank generated results from the language model to select query candidates sent to the user for selection as the search query. The query candidates are then displayed 320 to the user for selection. The user may select one of the query candidates to complete the search query or a word or search term (e.g., that the user has partially written). In the example of FIG. 3, the user continues to enter characters in the search interface of the user device, revising 325 the partial search query sent to the search system 305. In this example, the revised partial query is "Appel P" as a continuation of the initial partial query 310.

Rather than automatically restarting the generation of the query candidates using only the revised query, the search system 305 determines whether the previously-generated query candidates can be reused and expanded with the revised query. That is, because the generation of the query candidates may require significant resources and runtime (relative to the amount of time available for timely sending suggestions to the user), when query candidates are sufficiently similar to the revised partial query, relevant query candidates may be retained 330. The similarity of the current query candidates may be determined in various ways, such as comparison of the characters or terms of the revised partial query to the query candidates. In one embodiment, tokens associated with the terms may be identified along with associated embeddings (e.g., word embeddings) for the tokens. The embeddings may be compared, for example, as a similarity score or as a distance between the embedding values.

Rather than generate a new "first" token, the language model may then be applied to "expand" the previously generated query candidates by expanding 335 the selected candidates based on the revised partial query. As the query generation may be more constrained by latency and the structure of the language model typically requires generation of tokens in sequence (i.e., a previous token must be generated to be an input to a subsequent token generation), the selected candidates may also be expanded in parallel, enabling expansion of multiple candidates without significantly increasing latency. In addition, by selecting candidates based on relevance to the revised partial query, autosuggest query candidates may be retained that reflect spelling corrections and other similarities with the revised query and allows maintaining query candidates that otherwise were similar to the continued entry of the query by the user. In this example, although the revised query indicates "Appel," the previous query candidate "Apple" may have a sufficiently similar token embedding to be retained for further expansion. In some embodiments, additional query candidates may also be generated based on the revised partial query and combined with expansion of the selected candidates.

In this example, the expanded candidates result in a group of query candidates that expand the "Apple" query candidate to include "Apple Pie" and "Apple Pink." As further discussed below, the expanded candidates may also be ranked and/or filtered for selection to be sent to the user device. In the example of FIG. 3, the query candidates sent to the user device 300 include expansions of the "Apple" query candidates. In some embodiments, while further query candidates are generated by expanding the previous query candidates, the expanded candidates may not be selected for suggestion to the user. The further query candidates are displayed 340 to the user on the user device 300, similar to the display 320 of the previous set of query candidates.

The user may then select 345 the query candidate to revise the currently-entered query based on the selection and confirm the search query for execution. In some examples, the user may select the query candidate to revise the currently-entered partial query and then continue to enter additional characters, such that the further revisions of the partial query may be sent to the search system 305 to continue generating suggestions. Finally, the search query is received by the search system 305 and is used to execute 350 a search.

Figure 4:
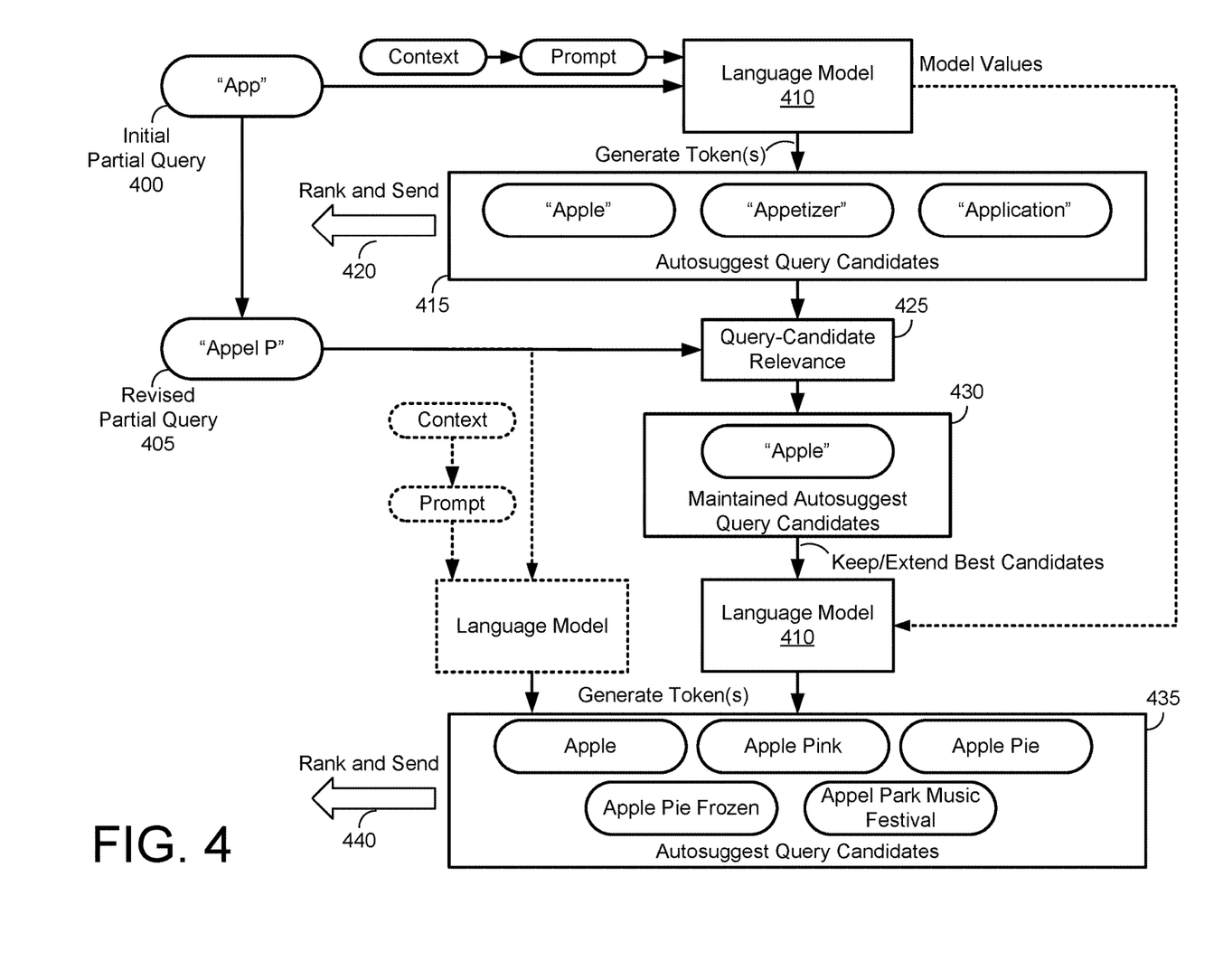
FIG. 4 illustrates a processing data flow for generating query candidates, in accordance with one or more embodiments.

FIG. 4 illustrates a processing data flow for generating query candidates, in accordance with one or more embodiments. The processing data flow of FIG. 4 thus shows one example of query candidate generation and selection as performed by the query suggestion module 250 of FIG. 2 or search system 305 of FIG. 3. In the example of FIG. 4, the user enters characters in the search interface and are captured as an initial partial query 400 and revised partial query 405 similar to the example of FIG. 3. Likewise, the particular examples and search space discussed related to a search space for online concierge systems, particularly related to grocery items. Additional embodiments may be similarly implemented in various alternate systems and contexts.

To generate the autosuggest query candidates 415, the initial partial query 400 is processed by a language model 410. The language model 410 processes an input token sequence $I_0\text{-}I_n$ and one or more existing output tokens to generate an additional output token. In this sense, the language model 410 is typically structured to generate output tokens sequentially, such that typically generating the $m^{th}$ output token $O_m$ is based on the previous output tokens $O_0\text{-}O_{m-1}$ and the set of input tokens. Each of the tokens in the language model 410 typically represents groups of characters or groups of words and may be described with an associated embedding. In some embodiments, the language model can be considered to have an encoder and a decoder, such as a "Transformer"-style model including various attention and feed-forward layers in the encoder and decoder. The encoder may encode the input token sequence to an input representation that is input to the decoder for generating output tokens. In some embodiments, the decoder receives the input representation along with a current sequence of output tokens (i.e., the output tokens through $O_{m-1}$) to generate a token for the current output token prediction. Such language models may be referred to as "large" language models, as these architectures may include millions or billions of parameters and may be trained on a large corpus of data about the language, such as books, articles, documents, transcripts, and generally-available text in the subject language (e.g., available Internet data in the language).

The input to the language model may be structured as a "prompt" in natural language to be processed by the language model, such that the tokens of the prompt are converted to respective tokens for input to the language model. The prompt may be constructed in various ways in different embodiments, and generally represents general language instructions and other information to be considered in generating output tokens by the language model. Because the language model can represent complex meaning of the input tokens in the input representation and is trained on a complex general language corpus, the language model may thus receive several words, sentences, or paragraphs as an input. In one embodiment, the prompt for the language model 410 is generated based on a particular context describing characteristics of the search query, such as the user, the search space, and other contextual data. For example, for an online concierge system, the context may also describe items currently in the user's order (e.g., in the user's shopping cart), the user's dietary preferences and conditions, and so forth.

The prompt may include a description of the context and related information in natural language for the language model 410 to generate output tokens related to the initial partial query 400. For example, the prompt may describe the context according to a template or other structure and may include the partial query to the language model, for example, including natural language introducing the partial query and requesting what the user may be searching for. In some embodiments, the initial partial query 400 may also be used to populate one or more output tokens for generation of a suggestion as the "next" search term that may be entered by a user.

The language model 410 processes the prompt to generate autosuggest query candidates 415. In further detail, execution of the language model (e.g., a Transformer model) may include applying a sequence of encoding layers to the input tokens to generate an encoded representation of the input.

The language model may include generating values for attention mechanisms, e.g., by projecting data to key, value, and query matrices. In the encoding layers, the attention may be performed across the input tokens and, in the final layer, generate the input sequence representation. In the decoder layers, the attention mechanism may be applied with the input sequence representation in conjunction with the current output token sequence (e.g., with output tokens $O_0$-$O_{m-1}$). In some embodiments, the key and value matrices in each decoder layer are determined based on the encoded input representation, while the query matrix is determined based on the layer's input. As such, when the language model is applied to generate several output tokens in sequence, data based on the input tokens (e.g., the input encoding representation and related attention matrices) may remain constant while the "prior" output token sequence is updated to include each sequential output token. When the output tokens are generated, the model values (e.g., parameters for the model as well as the relevant decoder layer matrices and tokens) of the maintained autosuggest query candidates 430 to be reused for expanding the autosuggest query candidates 415 as further discussed below.

The language model 410 may assign probabilities to possible output tokens representing the likelihood of the output token given the input sequence and specified prior output sequence. The output tokens may output as a probability of particular tokens, or the probability of a token relative to other tokens (e.g., as a softmax). To determine tokens for the autosuggest query candidates 415, the tokens may be selected based on the output token probabilities. As examples, the predicted token probabilities for the output tokens "apple" "appetizer" and "application" may respectively be 0.85, 0.80, and 0.79 as output values of the respective token logits. In this example, the prompt may include a description of the user's cart and that the output query is related to selecting groceries, which may allow the language model 410, even without any fine-tuning trained for the online concierge system, to increase the predicted likelihood for "apple" and "appetizer" and decrease the predicted likelihood for "application" due to general language associations of the context. That is, output tokens more related to the context (apple, appetizer) thus receive a higher prediction (relative to output token predictions without a context), while output tokens less related to the context receive a lower prediction (application).

In this example, the autosuggest query candidates 415 are generated as single tokens. In some embodiments, multiple output tokens may be generated, such as via speculative decoding or by continuing decoding additional tokens for high-likelihood output tokens. In some embodiments, the additional decoding may be performed for multiple output tokens in parallel and on parallel instances of the language model, enabling branched expansion of the tokens without significant time latency increase. In some embodiments, the output tokens may also be deduplicated and rules may be applied to standardize the results, such as to provide singular results instead of plural results (e.g., "Apple" instead of "Apples") or the like.

After generating the autosuggest query candidates 415, one or more of them may be sent to the user device. To further refine which query candidates are sent to the user device, the query candidates may be scored and ranked before sending 420. In some embodiments, the autosuggest query candidates 415 that were generated by the language model 410 are evaluated along with a set of query candidates generated by a "traditional" autosuggest model that is trained directly on user search queries. The query candidates may also be evaluated with respect to a search space relevant to the search request. This may determine, for example, whether the query candidates correspond to potential results in the search space. For the online concierge system, for example, the search space may correspond to items available at one or more locations relevant to the user's search. In the example of FIG. 4, the query candidate "Application" may have no relevant result in the search space and may be removed accordingly from the set of query suggestions sent to the user. Thus, while the output token predictions (e.g., the token logits) may be used to initially select the query candidates 415, the scoring and ranking 420 may be used to further confirm that the output tokens, based on a more general language model, are relevant to the particular search space. As such, the context may initially frame the application of the language model 410, while the evaluation against the search space may evaluate whether the particular output tokens suggested by the model are supported by particular results (e.g., items) for the search.

As discussed in FIG. 3, the user may continue to enter characters in the search interface and a revised partial query 405 is received. Rather than maintain all query candidates 415 or discard them for a completely new search, the query candidates 415 are scored with respect to the revised partial query 405 to determine relevance to the initial partial query 400 as a query-candidate relevance 425. The query candidates 415 may be evaluated for relevance with the revised partial query 405 and then included in the subsequent set of query candidates 435 (i.e., maintained or discarded) based on the relevance to the revised partial query 405. The relevance may be determined in a variety of ways as discussed above, such as a similarity of word embeddings for the tokens of the revised partial query and the query candidates. In some embodiments, as the revised partial query 405 may have incomplete terms or words, only complete words or completed words are considered for query-candidate relevance 425. In further examples, the query-candidate relevance 425 may be determined based on the similarity or match of individual characters, which may include partial words/terms. These and other approaches may also be combined, for example, scoring complete tokens with respect to token embeddings and scoring incomplete words based on individual character similarity. Individual query candidates may be maintained based on a comparison of the relevance score to a threshold, or the query candidates may be ranked according to relevance to the partial query and a number of the highest-scoring candidates may be maintained (e.g., a top N selection).

In the example of FIG. 4, while the revised partial query 405 of "Appel P" does not appear to match any of the query candidates 415 closely on a per-character basis, "Appel" may be represented with an embedding that suggests it appears in similar contexts as "Apple" (e.g., as a common misspelling), and thus "Apple" may have a similar embedding to "Appel." The language model 410 is then applied to each of the set of maintained autosuggest query candidates 430 to expand the output tokens as additional query candidates 435. Because the maintained autosuggest query candidates 430 were previously generated by the language model 410, the model values, such as attention matrices, input encoding, and so forth, may be reused by the language model to generate subsequent tokens. When there are multiple query candidates 415 that are sufficiently relevant to be maintained in the set of query candidates 430, the various candidates may be processed in parallel and reuse applicable model values. Because the model values may be reused, the further tokens generated for the maintained query candidates 430 may be generated more quickly than the generation of plural tokens in sequence based on the revised partial query 405. In addition, because the maintained query candidates 430 may include variations and other similar terms (e.g., misspelled terms), the expanded tokens for the query candidates 435 may be generated with the maintained tokens (e.g., the correctly-spelled token "apple") that provide additional alternatives that do not assume the desired search query is necessarily additional characters or terms to be added to the revised partial query. In this example, expanding the maintained query candidate "Apple" results in additional tokens "Pie" "Pink" and "Pie Frozen." In this example, speculative decoding may be applied to generate multiple tokens as in "Apple Pie Frozen."

The revised partial query 405 may also be used to generate query candidates, for example, with a respective prompt and the revised partial query used to generate inputs to the language model 410. In this example, the additional query candidate "Appel Park Music Festival" may be generated based on the revised partial query 405. As before, the query candidates 435 may then be scored with respect to the search space and used to select query candidates to send 440 to the user. In this example, although tokens were generated with a high similarity to "Appel P," evaluating the query candidate "Appel Park Music Festival" with respect to the search space for the query may indicate that no items are similar to the query candidate, such that it may not be provided as a suggestion to the user.

By maintaining the query candidates based on similarity to the revised partial query, additional output tokens can be efficiently generated by continuing token generation with prior model values. This may be performed in parallel for each of the relevant model values (and in parallel with generating tokens based directly on the revised partial query), allowing for additional query candidates that benefit from the language model within latency requirements of the search query.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example; comparing an output of the machine-learning model to the label associated with the training example; and updating weights associated for the machine-learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, the method comprising:
   receiving, from a user device, an initial partial search query, wherein the initial partial search query is entered by a user via a user interface displayed on the user device, and wherein the user interface is further configured to receive a search query;
   generating a first set of query candidates with a language model based on the initial partial search query;
   sending, to the user device, at least one of the first set of query candidates for display to the user in the user interface, wherein sending the at least one of the first set of query candidates for display to the user in the user interface makes the at least one of the first set of query candidates available for selection as the search query;

receiving a revised partial search query entered by the user on the user interface after the initial partial search query;
selecting a set of maintained query candidates from the first set of query candidates based on similarity of the first set of query candidates with respect to the revised partial search query;
generating a second set of query candidates with the language model based on expansion of the set of maintained query candidates; and
sending, to the user device, at least one of the second set of query candidates for display to the user in the user interface, wherein sending the at least one of the second set of query candidates for display to the user in the user interface makes the at least one of the second set of query candidates available for selection as the search query.

2. The method of claim 1, wherein generating the second set of query candidates comprises applying the language model in parallel instances to the set of maintained query candidates.

3. The method of claim 1, wherein generating the second set of query candidates with the language model based on expansion of the set of maintained query candidates comprises applying model values of the maintained query candidates from the first set of query candidates.

4. The method of claim 1, wherein selecting the set of maintained query candidates comprises scoring the first set of query candidates based on embedding similarity with the revised partial search query.

5. The method of claim 1, wherein generating the first set of query candidates comprises selecting the first set of query candidates based on a search space for executing the search query.

6. The method of claim 5, wherein the search space comprises an item inventory.

7. The method of claim 1, wherein the language model comprises a transformer model.

8. A computer program product comprising a non-transitory computer readable storage medium having instructions encoded thereon that, when executed by a processor, cause the processor to perform steps comprising:
receiving, from a user device, an initial partial search query, wherein the initial partial search query is entered by a user via a user interface displayed on the user device, and wherein the user interface is further configured to receive a search query;
generating a first set of query candidates with a language model based on the initial partial search query;
sending, to the user device, at least one of the first set of query candidates for display to the user in the user interface, wherein sending the at least one of the first set of query candidates for display to the user in the user interface makes the at least one of the first set of query candidates available for selection as the search query;
receiving a revised partial search query entered by the user on the user interface after the initial partial search query;
selecting a set of maintained query candidates from the first set of query candidates based on similarity of the first set of query candidates with respect to the revised partial search query;
generating a second set of query candidates with the language model based on expansion of the set of maintained query candidates; and
sending, to the user device, at least one of the second set of query candidates for display to the user in the user interface, wherein sending the at least one of the second set of query candidates for display to the user in the user interface makes the at least one of the second set of query candidates available for selection as the search query.

9. The non-transitory computer readable storage medium of claim 8, wherein generating the second set of query candidates comprises applying the language model in parallel instances to the set of maintained query candidates.

10. The non-transitory computer readable storage medium of claim 8, wherein generating the second set of query candidates with the language model based on expansion of the set of maintained query candidates comprises applying model values of the maintained query candidates from the first set of query candidates.

11. The non-transitory computer readable storage medium of claim 8, wherein selecting the set of maintained query candidates comprises scoring the first set of query candidates based on embedding similarity with the revised partial search query.

12. The non-transitory computer readable storage medium of claim 8, wherein generating the first set of query candidates comprises selecting the first set of query candidates based on a search space for executing the search query.

13. The non-transitory computer readable storage medium of claim 12, wherein the search space comprises an item inventory.

14. The non-transitory computer readable storage medium of claim 8, wherein the language model comprises a transformer model.

15. A system comprising:
one or more processors that execute instructions; and
a non-transitory computer-readable storage medium having instructions executable by the processor for:
receiving, from a user device, an initial partial search query, wherein the initial partial search query is entered by a user via a user interface displayed on the user device, and wherein the user interface is further configured to receive a search query;
generating a first set of query candidates with a language model based on the initial partial search query;
sending, to the user device, at least one of the first set of query candidates for display to the user in the user interface, wherein sending the at least one of the first set of query candidates for display to the user in the user interface makes the at least one of the first set of query candidates available for selection as the search query;
receiving a revised partial search query entered by the user on the user interface after the initial partial search query;
selecting a set of maintained query candidates from the first set of query candidates based on similarity of the first set of query candidates with respect to the revised partial search query;
generating a second set of query candidates with the language model based on expansion of the set of maintained query candidates; and
sending, to the user device, at least one of the second set of query candidates for display to the user in the user interface, wherein sending the at least one of the second set of query candidates for display to the user in the user interface makes the at least one of the second set of query candidates available for selection as the search query.

16. The system of claim 15, wherein generating the second set of query candidates comprises applying the language model in parallel instances to the set of maintained query candidates.

17. The system of claim 15, wherein generating the second set of query candidates with the language model based on expansion of the set of maintained query candidates comprises applying model values of the maintained query candidates from the first set of query candidates.

18. The system of claim 15, wherein selecting the set of maintained query candidates comprises scoring the first set of query candidates based on embedding similarity with the revised partial search query.

19. The system of claim 15, wherein generating the first set of query candidates comprises selecting the first set of query candidates based on a search space for executing the search query.

20. The system of claim 19, wherein the search space comprises an item inventory.

* * * * *